US011556312B2

United States Patent
Sebastian et al.

(10) Patent No.: US 11,556,312 B2
(45) Date of Patent: Jan. 17, 2023

(54) PHOTONIC IN-MEMORY CO-PROCESSOR FOR CONVOLUTIONAL OPERATIONS

(71) Applicants: International Business Machines Corporation, Armonk, NY (US); University of Muenster, Munster (DE); University of Exeter, Exeter (GB); Oxford University Innovation Limited, Oxford (GB)

(72) Inventors: Abu Sebastian, Adliswil (CH); Manuel Le Gallo-Bourdeau, Zurich (CH); Christopher David Wright, Lympstone (GB); Nathan Youngblood, Pittsburgh, PA (US); Harish Bhaskaran, Oxford (GB); Xuan Li, Oxford (GB); Wolfram Pernice, Munster (DE); Johannes Feldmann, Munster (DE)

(73) Assignees: International Business Machines Corporation, Armonk, NY (US); Oxford University Innovation Limited, Oxford (GB); University of Exeter, Exeter (GB); University of Muenster, Muenster (DE)

( * ) Notice: Subject to any disclaimer, the term of this patent is extended or adjusted under 35 U.S.C. 154(b) by 209 days.

(21) Appl. No.: 16/925,998

(22) Filed: Jul. 10, 2020

(65) Prior Publication Data
US 2022/0012013 A1    Jan. 13, 2022

(51) Int. Cl.
*G06F 7/544*   (2006.01)
*G06N 3/067*   (2006.01)
*G06F 17/16*   (2006.01)

(52) U.S. Cl.
CPC ............ *G06F 7/5443* (2013.01); *G06F 17/16* (2013.01); *G06N 3/0675* (2013.01)

(58) Field of Classification Search
CPC ..... G06F 17/16; G06F 7/5443; G06N 3/0675; G02F 3/00–028; G02F 2203/58;
(Continued)

(56) References Cited

U.S. PATENT DOCUMENTS 10,268,232 B2   4/2019   Harris et al.
10,311,126 B2   6/2019   Le Gallo et al.
(Continued)

FOREIGN PATENT DOCUMENTS

WO   2019/032808 A1   2/2019

OTHER PUBLICATIONS

S. Abdollahramezani et al., Tunable nanophotonics enabled by chalcogenide phase-change materials, Nanophotonics, 9(5): 1189-1241, Jun. 6, 2020 (Year: 2020).*
J. Lee, Adaptive Precision CNN Accelerator Using Radix-X Parallel Connected Memristor Crossbars, arXiv:1906.09395v1 [eess.SP], 2019 (Year: 2019).*
(Continued)

*Primary Examiner* — Emily E Larocque
(74) *Attorney, Agent, or Firm* — Scully, Scott, Murphy & Presser, P.C.; Daniel P. Morris

(57) ABSTRACT

A co-processor for performing a matrix multiplication of an input matrix with a data matrix in one step may be provided. The co-processor receives input signals for the input matrix as optical signals. A plurality of photonic memory elements is arranged at crossing points of an optical waveguide crossbar array. The plurality of memory elements is configured to store values of the data matrix. Input signals are connected to input lines of the optical waveguide crossbar array. Output lines of the optical waveguide crossbar array represent a dot-product between a respective column of the optical waveguide crossbar array and the received input signals, and values of elements of the input matrix to be multiplied with the data matrix correspond to light intensi-
(Continued)

ties received at input lines of the respective photonic memory elements. Additionally, different wavelengths are used for each column of the input matrix optical signals.

20 Claims, 8 Drawing Sheets

(58) Field of Classification Search
CPC ....... G11C 11/42; G11C 13/04; G11C 13/041; G11C 13/048
See application file for complete search history.

(56) References Cited

U.S. PATENT DOCUMENTS

2019/0043560 A1  2/2019  Sumbul et al.
2020/0019851 A1* 1/2020  Mehrabian ........... G06N 3/0454

OTHER PUBLICATIONS

B. Shastri et al., Principles of Neuromorphic Photonics, arXiv:1801.00016v1 [cs.ET] 2017 (Year: 2017).*
I. Chakraborty et al., Photonic In-Memory Computing Primitive for Spiking Neural Networks Using Phase-Change Materials, Physical Review Applied 11, 014063, 2019 (Year: 2019).*
J. Feldman et al., All-optical spiking neurosynaptic networks with self-learning capabilities, Nature 569, May 8, 2019 (Year: 2019).*
J. Feldman et al., Parallel convolution processing using an integrated photonic tensor core, Research Gate, Feb. 2020 (Year: 2020).*
Fan, D., et al., "Energy Efficient In-Memory Binary Deep Neural Network Accelerator with Dual-Mode SOT-MRAM", 2017 IEEE 35th International Conference on Computer Design, Nov. 5-8, 2017, pp. 609-612.
Rios, C., et al., "In-memory computing on a photonic platform". Science Advances, Feb. 15, 2019, vol. 5, No. 2, https://advances.sciencemag.org/content/5/2/eaau5759, Accessed Jul. 10, 2020, pp. 1-9.
Sadou, I.I., "Convolutional neural networks and their application in self driving cars", https://medium.com/@ismailou.sa/convolutional-neural-networks-and-their-application-in-self-driving-cars-33fa0a1625c8, Jun. 4, 2018, Accessed on Jul. 10, 2020, 6 pages.
Xu, X., et al., "Scaling for edge inference of deep neural networks", Nature Electronics, Apr. 2018, pp. 216-222, vol. 1.
Rios, C., et al., "Integrated all-photonic non-volatile multi-level memory", Nature Photonics, Nov. 2015, pp. 725-733, vol. 9.
Sebastian, A., et al., "Tutorial: Brain-inspired computing using phase-change memory devices", Journal of Applied Physics, Received May 31, 2018, Accepted Aug. 20, 2018, Published online Sep. 18, 2018, pp. 111101-1-111101-15, vol. 124.
Sebastian, A., et al., "Computational memory-based inference and training of deep neural networks", 2019 Symposium on VLSI Technology Digest of Technical Papers, Jun. 9-14, 2019, pp. T168-T169.
Shafiee, A., et al., "ISAAC: A Convolutional Neural Network Accelerator with In-Situ Analog Arithmetic in Crossbars", 2016 ACM/IEEE 43rd Annual International Symposium on Computer Architecture, Jun. 18-22, 2016, pp. 14-26.

* cited by examiner $$\begin{pmatrix} a_{11} & a_{12} & \cdots & a_{1j} \\ a_{21} & a_{22} & \cdots & a_{2j} \\ \cdots & \cdots & \cdots & \cdots \\ a_{i1} & a_{i2} & \cdots & a_{ij} \end{pmatrix}^T \times \begin{pmatrix} x_{11} & \cdots & x_{1k} \\ x_{21} & \cdots & x_{2k} \\ \cdots & \cdots & \cdots \\ x_{i1} & \cdots & x_{ik} \end{pmatrix} = \begin{pmatrix} y_{11} & \cdots & y_{1k} \\ y_{21} & \cdots & y_{2k} \\ \cdots & \cdots & \cdots \\ y_{j1} & \cdots & y_{jk} \end{pmatrix}$$

FIG. 2

$$\begin{pmatrix} a_{11} & a_{12} & \cdots & a_{1j} \\ a_{21} & a_{22} & \cdots & a_{2j} \\ \cdots & \cdots & \cdots & \cdots \\ a_{i1} & a_{i2} & \cdots & a_{ij} \end{pmatrix}^T \times \begin{pmatrix} x_{11} & \cdots & x_{1k} \\ x_{21} & \cdots & x_{2k} \\ \cdots & \cdots & \cdots \\ x_{i1} & \cdots & x_{ik} \end{pmatrix} = \begin{pmatrix} y_{11} & \cdots & y_{1k} \\ y_{21} & \cdots & y_{2k} \\ \cdots & \cdots & \cdots \\ y_{j1} & \cdots & y_{jk} \end{pmatrix}$$

FIG. 3

PHOTONIC IN-MEMORY CO-PROCESSOR FOR CONVOLUTIONAL OPERATIONS

STATEMENT REGARDING FEDERALLY SPONSORED RESEARCH OR DEVELOPMENT

The project leading to this application has received funding from the European Union's Horizon 2020 research and innovation program under grant agreement No 780848.

BACKGROUND

The invention relates generally to a matrix-matrix multiplication, and more specifically, to a co-processor for performing a matrix-matrix multiplication of an input matrix with a data matrix in one step. The invention relates further to a related computer-implemented method, and a computer program product.

Continuous data growth is one of the ongoing trends for enterprise IT (information technology). In order to generate meaningful results, enterprise IT organizations thrive for a more and more intensive usage of the data by continuously better analysis. However, it turned out that classic data analysis techniques are no longer sufficient to analyze the vast amount of unstructured—or better, semi-structured—data. With the proliferation of ultra-high-speed more networks and Internet-connected devices, the world is generating exponentially increasing amounts of data that needs to be processed in a fast, efficient and "smart" way. Science and enterprise IT organizations are increasingly using artificial intelligence (AI) techniques to better understand the available data and generate value out of it. On the other side, it turned out that traditional van-Neumann computing architectures may no longer be sufficient to deal with the ever-growing amount of data, data movements and the related computing requirements.

Especially, AI methods and techniques may require a lot of mathematical operations to the input data, e.g., in the form of matrix-matrix multiplications, often used in, e.g., image recognition/classification, autonomous navigation, and audio analysis in the frequency domain. Such data belong more and more—alongside with speech data, other sound data, as well as input in form of text documents or a mixture of text and image—to the stream of incoming data in classical data centers. The consequence is a continued requirement to process the continuously exponentially growing amount of data and ever increasing processing speed consuming more and more electrical power. Hence, there is a requirement to implement low-power, high-speed data processing devices which may be operated as co-processors to traditional computing architectures. Such devices may be capable of operating at Tera-Multiply-Accumulate per second (TMAC/s) speed.

SUMMARY

According to one aspect of the present invention, a co-processor for performing a matrix multiplication of an input matrix with a data matrix in one step may be provided. The co-processor may comprise a receiving unit adapted for receiving input signals for the input matrix as optical signals and a plurality of photonic memory elements, arranged at crossing points of an optical waveguide crossbar array. Thereby, the plurality of photonic memory elements may be configured to store values of the data matrix. The receiving unit may be connected to input lines of the optical waveguide crossbar array.

A respective output signal of each of output lines of the optical waveguide crossbar array may represent a dot-product between a respective column of the optical waveguide crossbar array and the received input signals, and values of elements of the input matrix to be multiplied with the data matrix, may correspond to light intensities received at input lines of the respective photonic memory elements. Thereby, different wavelengths may be used for each column of the input matrix optical signals, such that the input matrix is multiplied with the data matrix in one step.

According to another aspect of the present invention, a computer-implemented method for operating a co-processor for performing a matrix multiplication of an input matrix with a data matrix in one step may be provided. Thereby, a plurality of photonic memory elements may be arranged at crossing points of an optical waveguide crossbar array. The method may comprise storing values of the data matrix in the plurality of photonic memory elements. A receiving unit may be connected to input lines of the optical waveguide crossbar array.

The method may comprise receiving input signals for the input matrix as optical signals. A respective output signal of each of output lines of the optical waveguide crossbar array may represent a dot-product between a respective column of the optical waveguide crossbar array—in particular, values of the data stored optical waveguide crossbar array—and the received input signals, in particular respective values. Thereby, values of elements of the input matrix to be multiplied with the data matrix correspond to light intensities may be received at input lines of the respective photonic memory elements. The method may also comprise using different wavelength for each column of the input matrix optical signals, such that the input matrix may be multiplied with the data matrix in one step.

Furthermore, embodiments may take—at least in parts—the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
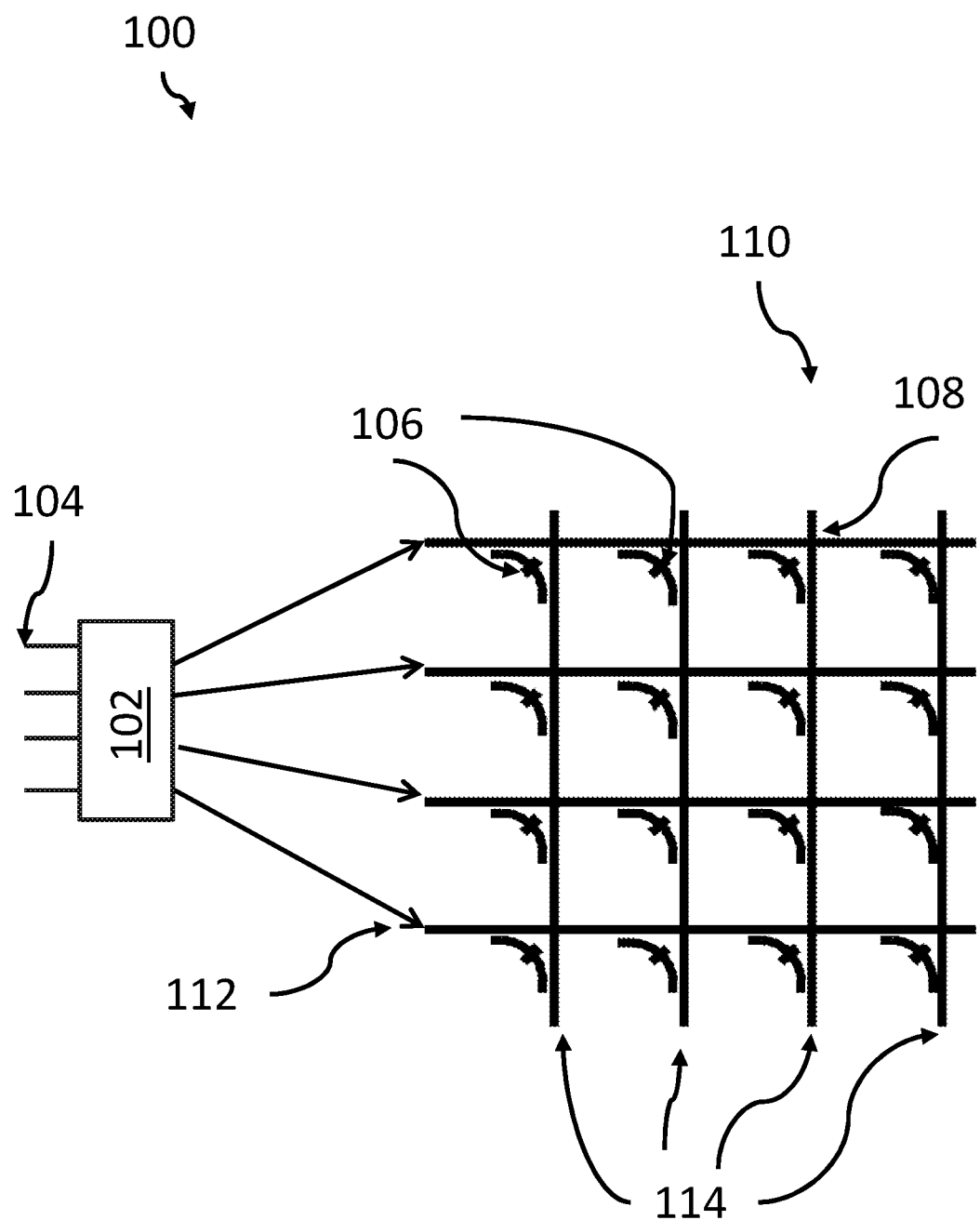

Preferred embodiments of the invention will be described, by way of example only, and with reference to the following drawings:

FIG. 1 shows a block diagram of an embodiment of the inventive co-processor for performing a matrix-matrix multiplication of an input matrix with a data matrix in one step.

FIG. 2 shows an illustration of how an input matrix and the data matrix may be mapped to the optical waveguide crossbar array.

FIG. 3 shows an illustration of how an input matrix and the data matrix may be mapped to the optical waveguide crossbar array of different wavelength may be used per element value of the input matrix.

Figure 4:
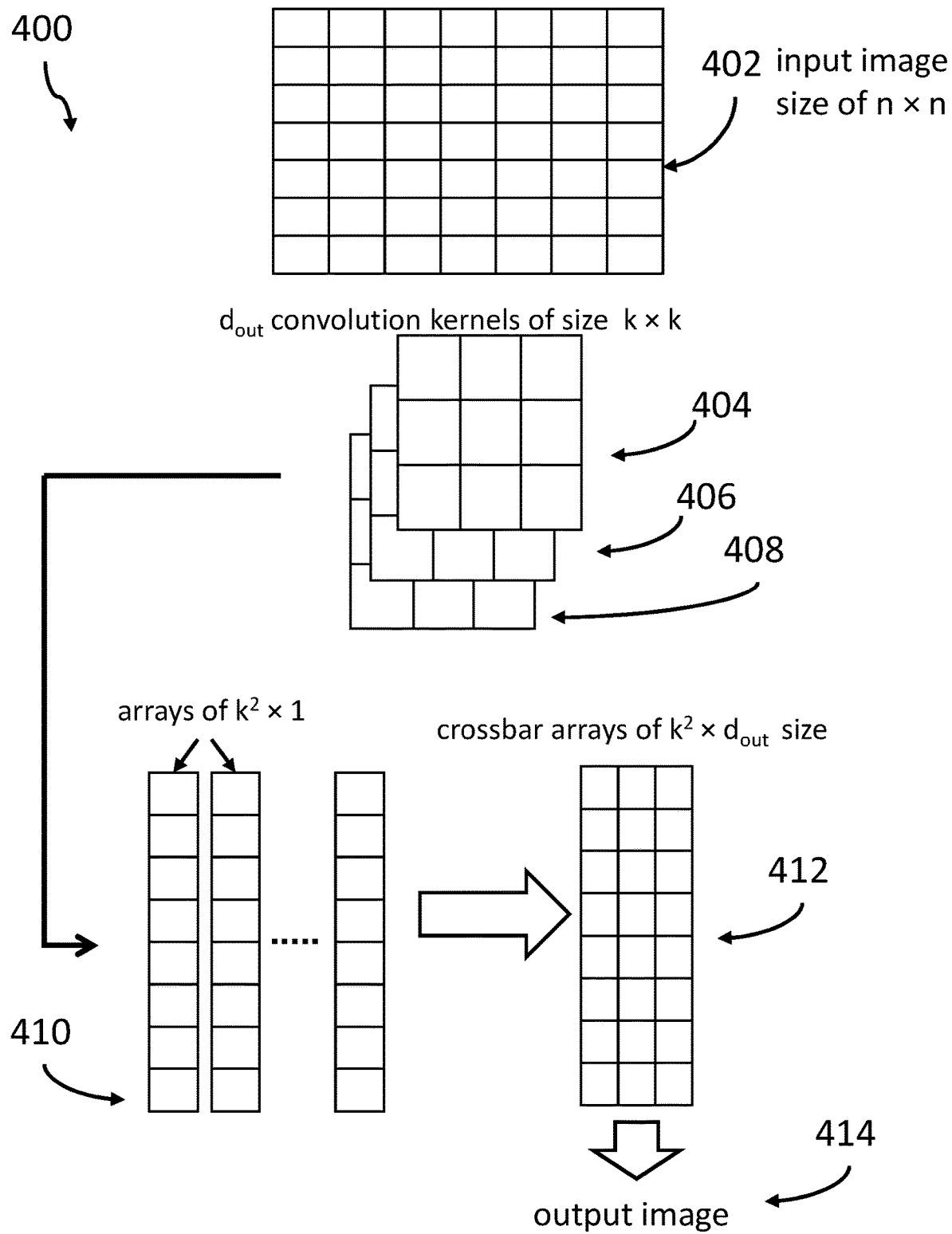

FIG. 4 shows a block diagram of a convolutional function, typically be used in image recognition.

Figure 5:
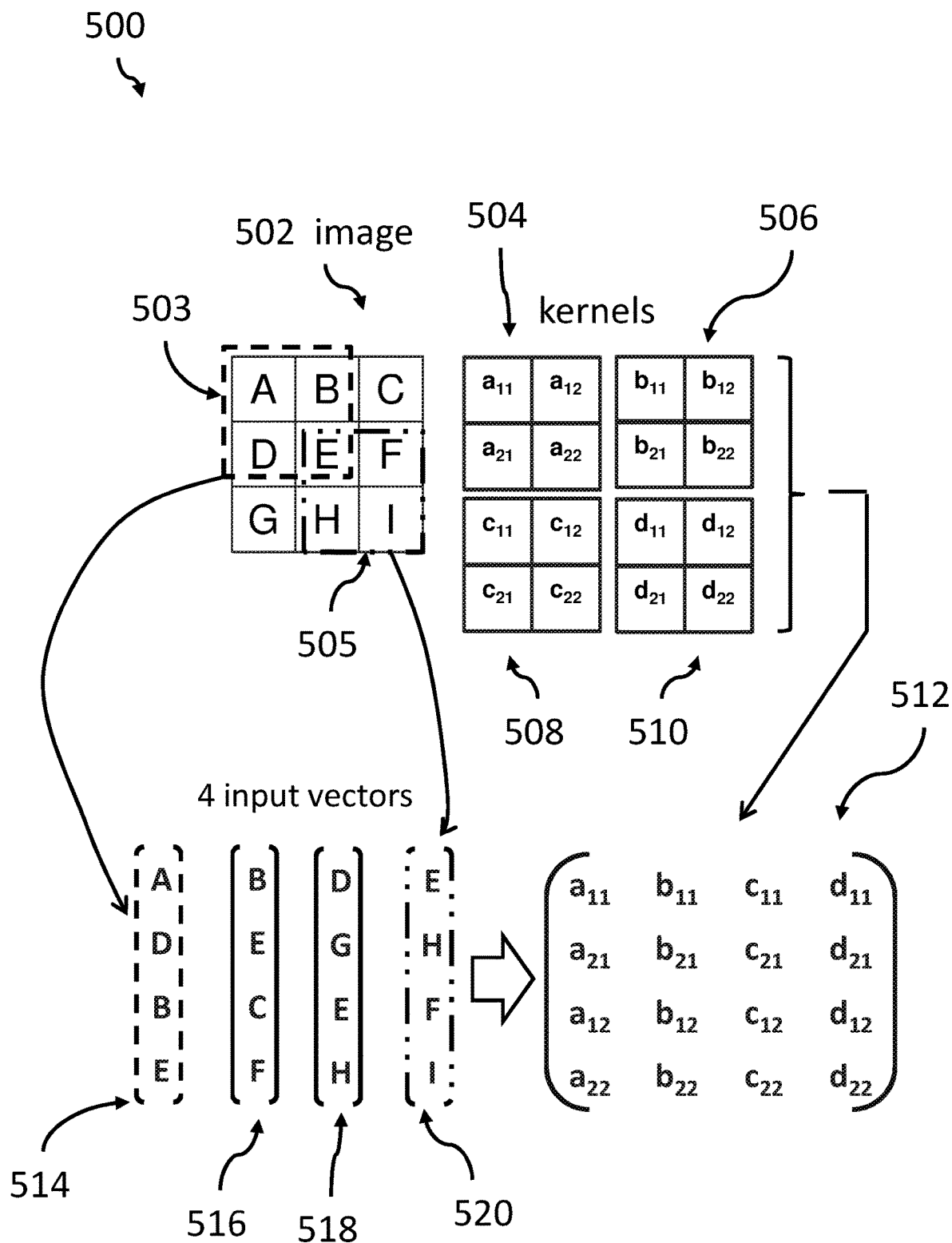

FIG. 5 shows the convolution concept using a simple 3×3 image and four convolution kernels.

Figure 6:
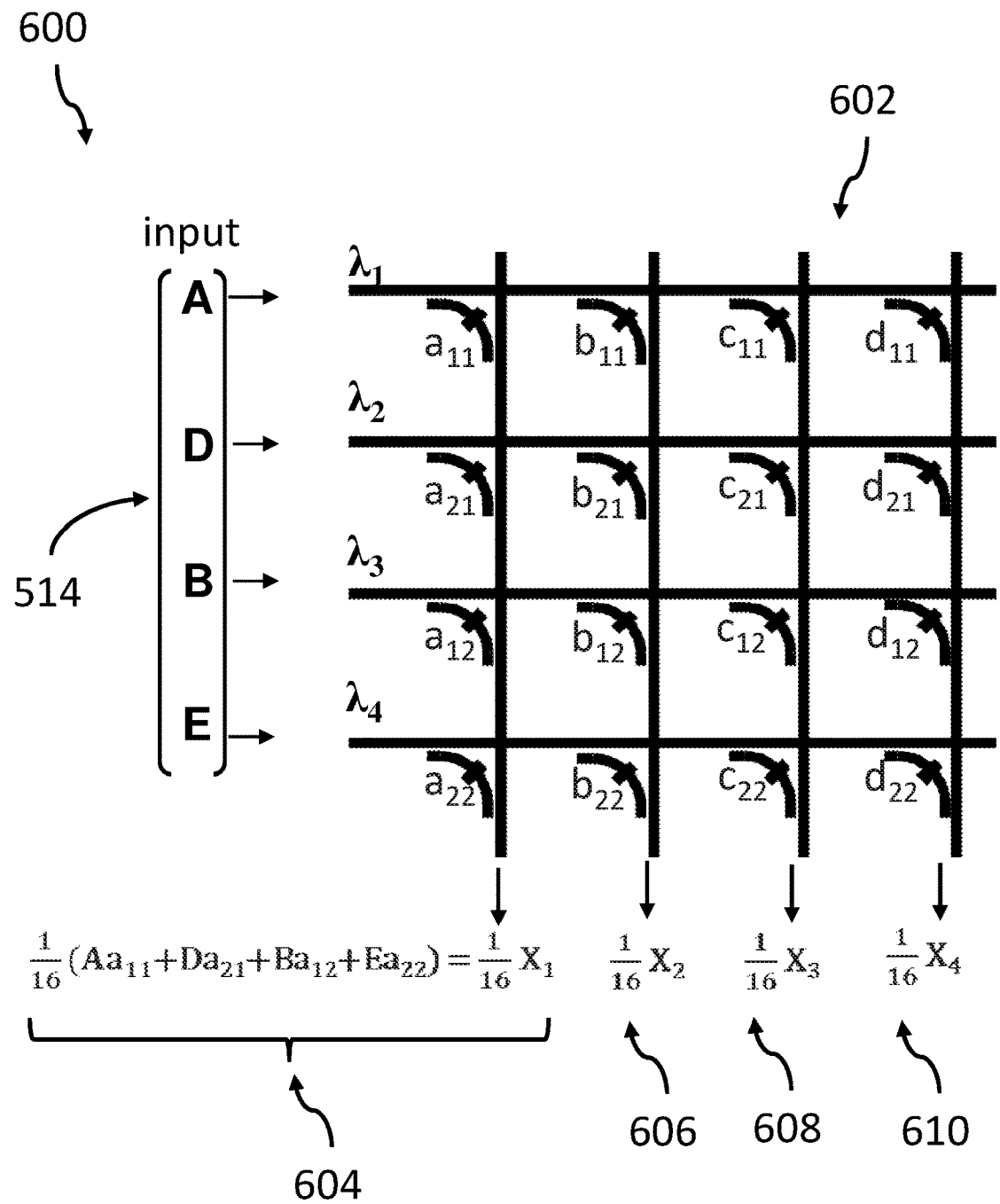

FIG. 6 shows a continuation of the example, discussed in FIG. 5.

Figure 7:
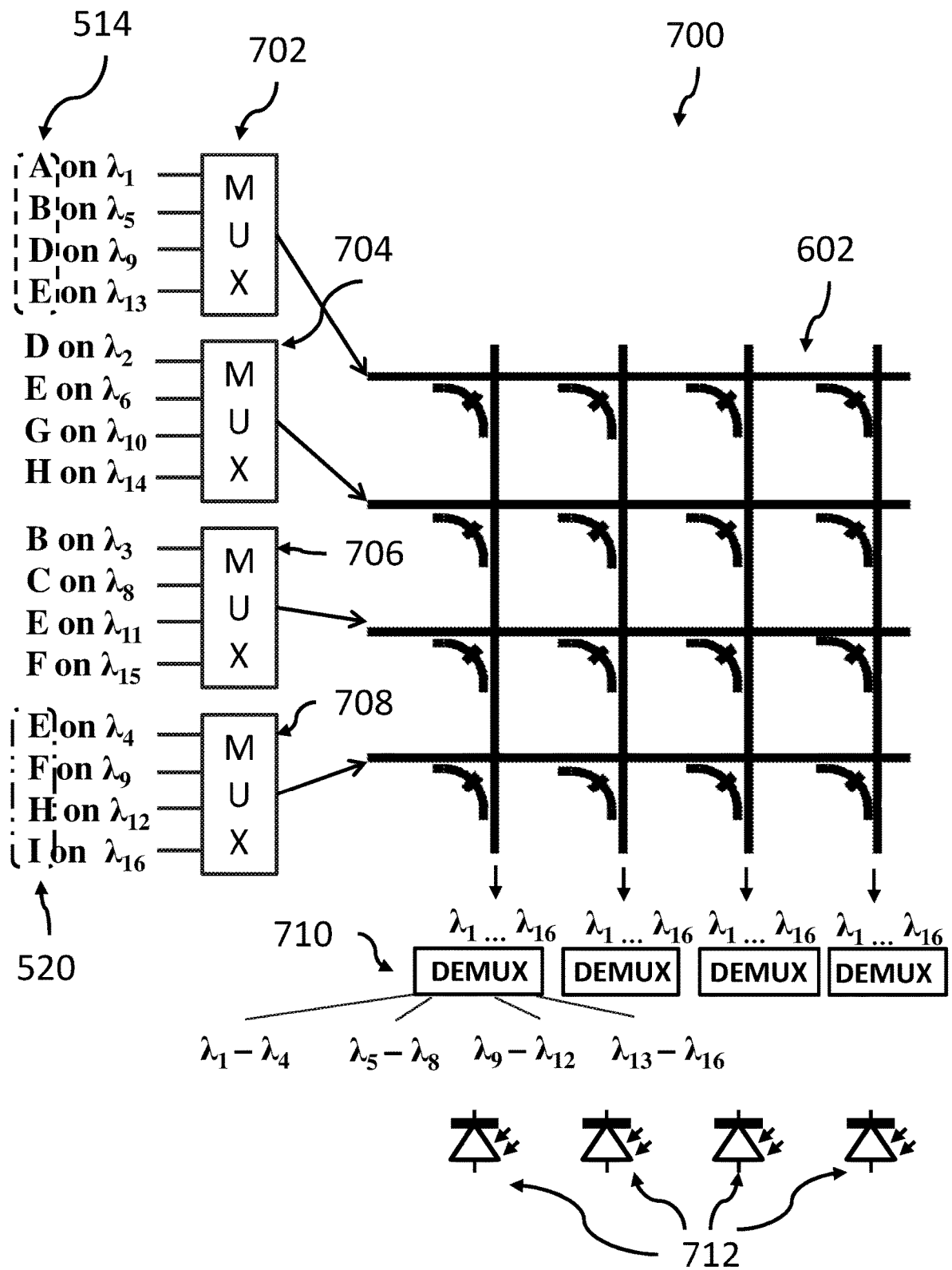

FIG. 7 shows an extended implementation of the general underlying concept illustrated in the context of FIG. 6 using WDM to perform multiple convolutions at the same time.

Figure 8:
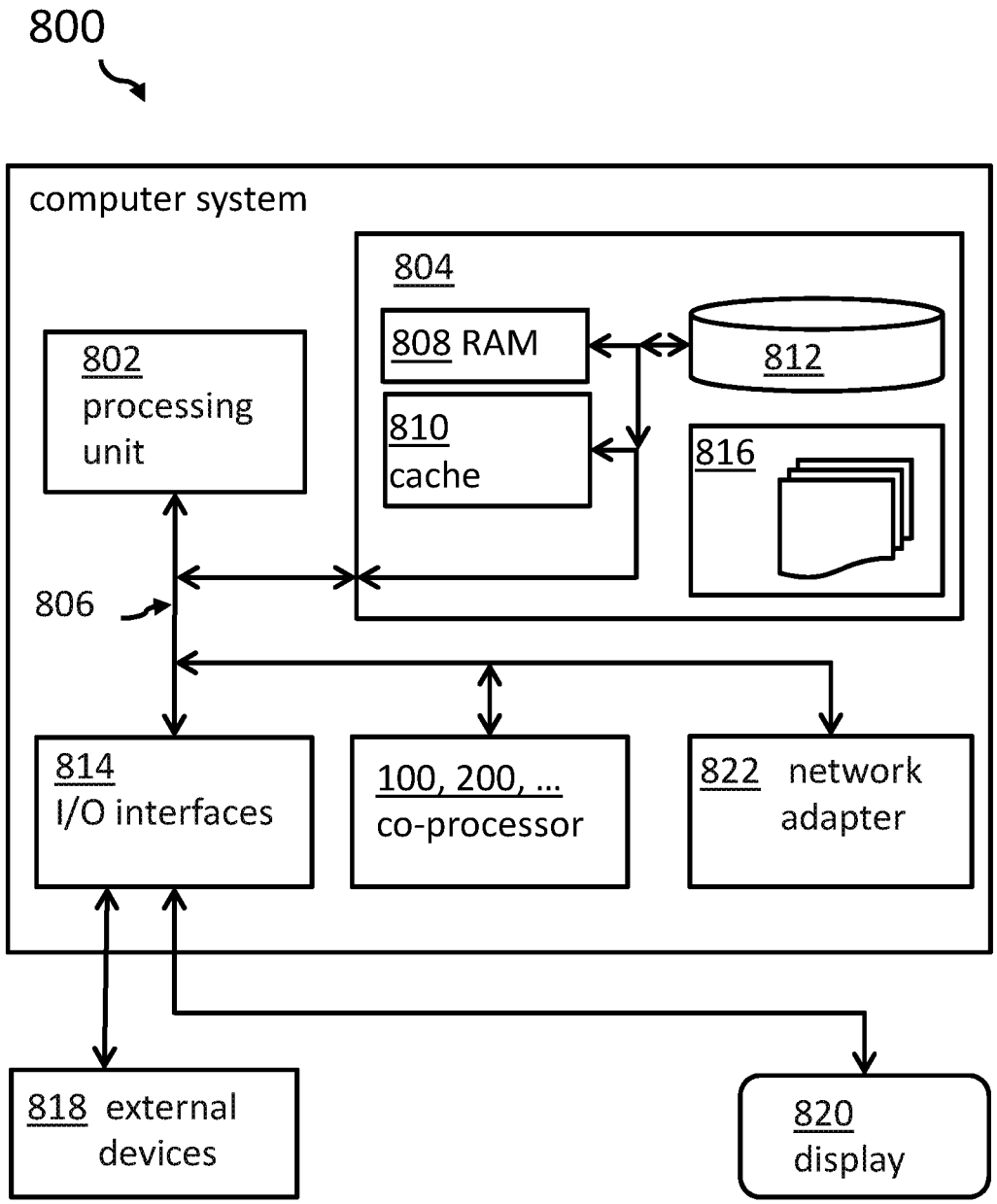

FIG. 8 shows a computing system also comprising the proposed co-processor.

DETAILED DESCRIPTION

In the context of this description, the following conventions, terms and/or expressions may be used:

The term 'co-processor' may denote a special-purpose device, e.g., implemented as ASIC (application specific integrated circuit) which may be used in combination with a general-purpose processor for addressing convolutional problems. The co-processor may be designed for a specific task, here, for a matrix-matrix multiplication. The co-processor may be implemented using an optical waveguide crossbar array as its core element. Electrical input signals may be converted to optical signals—e.g., using integrated lasers—and the optical output signals may be converted to electrical signals, e.g., using photodetectors and potentially subsequent signal processing circuits.

The term 'in one step'—in particular a one-step matrix-matrix multiplication—may denote that all computations and/or determinations of elements of the input matrix with elements of a data matrix may be performed at the same time. A serialization of the computation of columns or rows of the matrices is not required. Thus, independent of the size of the matrices, the matrix-matrix multiplication may always require the same amount of time. Thereby, one of the matrices may—in a simpler implementation form—be a vector.

The term 'optical signal' may denote photonic impulses within a waveguide. The optical signal may be modulated, i.e., having a varying intensity over time, such that at a specific time the optical signal may represent a specific value.

The term 'photonic memory element' may denote a memtransmittive device comprising an optical input line, i.e., an input waveguide, and an optical output line, i.e., an output waveguide, crossing each other, wherein at the crossing point of the two waveguides a phase-change memory element may be positioned. The phase-change memory element may influence light transmission from the input waveguide to the output waveguide depending on the status (e.g., crystalline versus amorphous) of the phase-change memory element. Once a value has been written to the phase-change memory element, no additional electrical power may be required to maintain the phase-change memory element in its current state.

The term 'optical waveguide crossbar array' may denote a crossing of a plurality of input waveguides and a plurality of output waveguides, wherein a distance between cross points may typically be equidistant. Additionally, an angle between the input waveguides and the output waveguides may be in the area of about 90°.

The term 'dot-product' may denote the well-known mathematical operation—in its simplest form—between two vectors resulting in a single real value.

The term 'nano-photonic waveguide' may denote an optical waveguide with a size in the order of 100 nm.

The term 'phase-change material layer' may denote a layer comprising the phase-change material positioned directly atop a crossing point of an input waveguide and an output waveguide. This way the phase-change material layer or device may be enabled to influence the optical transmission from the input waveguide to the output waveguide depending on the status of the phase-change material device.

The term 'convolutional kernel'—also denoted as convolution matrix or mask for image processing purposes—may denote a small matrix if compared to an input image for the purpose of blurring, sharpening, embossing, edge detection, and more. The convolution operation may be performed between the convolutional kernel and the input image.

The term 'photodetector' may denote an opto-electronic device adapted for converting optical signals into electrical signals. A photodetector device may be implemented as semiconductor device, e.g., a photo diode.

The term 'optical-digital signal processing unit' may denote a mainly electronic device also comprising optical waveguides ending at photodetectors such that the related electrical signals may be processed using signal filters implemented in the electronic domain.

The term 'reference state' may denote that a column—or alternatively a row—of the optical waveguide crossbar array may represent a value above zero, i.e., an offset value. This way, it may become possible to represent negative data matrix values with photonic memory elements that may be physically constrained to encode only positive.

The proposed co-processor for performing a matrix multiplication of an input matrix with a data matrix in one step may offer multiple advantages, technical effects, contributions and/or improvements:

The proposed concept combines the advantages of photonic waveguides with memristive elements implemented using phase-change material. The proposed concept may exploit fundamental physical principles—namely differences in optical absorption—for computation. This may deliver higher speed, higher precision and better linearity of computing if compared to pure electrical equivalents using phase-change material.

Data may be stored in a phase-change layer on top of a nano-photonic waveguide. The reading and writing process is based on an evanescent coupling of the phase-change material to the waveguide. The write process to a photonic memristive element is performed by applying heat to the phase-change material in using a phase transition. During a read process, the variation optical transmission through the waveguide varying degrees of absorption depending on the phase configuration is monitored. The phase-change material may represent a plurality of different values.

Especially, in the case of convolution operation based AI systems, the computation speed and throughput may be increased significantly. In-memory computing is often used for accelerating deep learning inference and training. This state-of-the-art approach may be mapped to weights, corresponding to the convolutional layers, of the resistive memory elements organized in a crossbar configuration. A 2D convolution may be represented as a matrix-matrix multiplication with the one matrix containing the image patches (to be recognized), and the other matrix the stretched—i.e., vectorized—convolution kernels. The filters may typically be stretched out to 1D arrays and horizontally stacked on a memristive crossbar. Different image patches may then be extracted from the input image, stretched out and finally rearranged to form the columns of a large matrix. This may be repeated for different color channels.

Thus, the here proposed concept may address the critical bottleneck for CNNs (convolutional neural networks) acceleration due to its matrix-matrix multiplication one step, i.e., one clock cycle. The photonic memory elements may be used to store the elements of the convolutional kernel(s). The input signals may be applied as light signals of varying intensity. Thereby, the multitude of input signals, which may need to be applied to perform a single convolution operation, may be applied simultaneously with different wavelength (WDM). This may in turn facilitate the simultaneous computation of all matrix-vector multiply operations associated with a single convolution operation. As a consequence, orders of magnitude higher speed than any other state-of-the-art technique may be achieved based on the photonic core by parallelized photonic in-memory computing using phase-change memory arrays and photonic chip-based optical frequency combs (soliton micro-combs). The computation may be reduced to measuring the optical transmission of configurable and non-resonant, i.e., broadband, passive components operating at a bandwidth exceeding, e.g., 40 GHz, limited only by the speed of the modulators and photodetector. The power consumption for matrix multiplication may thus be reduced by orders of magnitude.

One of the core advantages may lie in the encoding of image data onto the individual comb teeth of an on-chip frequency comb, and subsequently encoding fixed convolutional kernels in the non-volatile configuration (i.e., the amorphous or crystalline phase) of integrated phase-change material cells that couple evanescently to a matrix of interconnected photonic waveguides. Thereby, both, latency and the movement of data may be reduced significantly, whereby, at the same time, the footprint costs of photonics by multiplexing computations in the same photonic core may also be reduced. As already mentioned, both, the soliton micro-combs as well as the matrix of photonic waveguides may be implemented in silicon technology, e.g., silicon nitride, which may represent an ultra-low loss, CMOS compatible nonlinear integrated photonic platform that is compatible to wafer scale manufacturing and foundry. Hence, fully integrated custom photonic tensor cores may be realized at low-cost points.

The proposed concept may also have the advantage that besides WDM also polarization, multimodal excitation, etc., may be used to encode the input signals. Furthermore, the concept may allow implementing a complete neural network, wherein the individual convolution processors make the state. The complete neural network realization may also be implemented by interfacing the crossbar array with digital (a) processor(s). Additionally, the complete neural network may also be implemented by interfacing individual convolutional co-processors with a computational memory unit comprising the complete devices.

Thus, beside the speed advantage for matrix-matrix multiplication, the here proposed concept may build a basis for a variety of additionally added photonic and/or electronic components which may be integrated on a single base substrate material. The photonic components, the memristive elements as well as traditional CMOS devices may be integrated into one single chip allowing a comparably easy and well understood manufacturing process.

In the following, additional embodiments—applicable to the co-processor as well as to the method—will be described:

According to one optional embodiment of the co-processor, different wavelengths may be used for each element value of the input matrix. Hence, each element of the input matrix may use a different wavelength for delivering its value via the intensity of the related optical signal. This further enhancement may result in an even better functioning of the optical waveguide crossbar array—in particular due to lower risk of optical interference—in performing its matrix-matrix multiplication task.

According to an additionally enhanced embodiment of the co-processor, different wavelengths may be multiplexed before led to the optical waveguide crossbar array and de-multiplexed after the optical waveguide crossbar array. This feature may contribute to the sensitivity regarding the output signals and thus deliver a better preciseness of the complete photo-electronic circuit.

According to an advantageous embodiment of the co-processor, each of the plurality of photonic memory elements may comprise, adjacent to a nano-photonic waveguide, a phase-change material layer. This layer may alternatively be vanadium dioxide and/or barium titanate based. The term "adjacent" above may denote that the photonic memory elements may be indirectly attached to the nano-photonic waveguides in order to guarantee a good influencing, i.e., coupling influence. Because the preciseness of the matrix-matrix multiplication depends on the correctness of the data matrix, high-quality photonic memory elements may be required to achieve optimal results.

According to a possible embodiment of the co-processor, the elements of the data matrix correspond to values of elements of linearized convolutional kernels of a convolutional neural network. This way, a plurality of multiplications for different convolutional kernels may be performed at once, i.e., in one single modification step. The different convolutional kernels may relate to different color channels, e.g., in the RGB or any other suitable color scheme. Hence, there is no longer a need for a sequential multiplication of the linearized convolutional kernel values with the respective input matrix. This may, in particular, accelerate advantageously algorithms, e.g., suitable and/or optimized for image recognition purposes or other areas addressable by convolutions techniques.

According to an additionally advantageous embodiment of the co-processor, the signal values of the output lines of the optical waveguide crossbar array may correspond to elements of a convolution result. No additional computational steps are required for the convolution result. Because a convolutional kernel is typically significantly smaller than a complete input image, the proposed method may be well suited to produce the convolutional result in few steps. Additionally, it may be required to convert the optical signal to respective electrical signals in order to continue with conventional silicon-based signal processing elements.

Therefore, and according to a preferred embodiment of the co-processor, each of the output lines of the optical waveguide crossbar array may be connected to a respective photodetector. This may be suited to perform the light/electric signal conversion. Additionally, an ADC (analog-digital converter) may either be attached to, or also integrated with, the respective photodetector(s). Hence, according to a further possible embodiment of the co-processor, each of the output lines of the optical waveguide crossbar array may be connected to a respective integrated optical-digital signal processing unit. Such a circuit may be adapted for signal detection as well as for summarization functions. All optical digital signal processing units may be integrated with the optical waveguide crossbar array. This may be possible because the optical waveguide technology may be compatible with the production process of CMOS devices. It may also be mentioned that more than one optical waveguide crossbar array may be integrated on a single substrate.

According to one further advantageous embodiment of the co-processor, one of the columns of the optical waveguide crossbar array may be left in a reference state. The reference state may be defined comprising photonic memory elements programmed to a well-known reference value. This way, it may become possible to deal with negative data values by subtracting the output of the reference column from the output values of the optical waveguide crossbar array. At least one column of the array being left in the reference state may be required. Optionally, also a plurality of such reference columns may be used for a higher precision at the output line of the optical waveguide crossbar areas. Different ones of such outputs of such reference columns may build a mean value as a reference value.

According to one useful embodiment of the co-processor, the optical waveguide crossbar array may comprise, at each crossing point, one of the photonic memory elements connecting a respective one of the input lines with a respective one of the output lines. This way, the crossbar array may be well-defined. The array may be a regular array with a constant distance between its crossing points in a horizontal and vertical dimension on the surface of a carrier substrate.

In the following, a detailed description of the figures will be given. All instructions in the figures are schematic. Firstly, a block diagram of an embodiment of the inventive co-processor for performing a matrix multiplication of an input matrix with a data matrix in one step is given. Afterwards, further embodiments, as well as embodiments of the computer-implemented method for operating a co-processor for performing a matrix multiplication of an input matrix with a data matrix in one step, will be described.

FIG. 1 shows a block diagram of a preferred embodiment of the co-processor for performing a matrix multiplication of an input matrix with a data matrix in one step. The co-processor 100 comprises a receiving unit 102 adapted for receiving input signals 104 for the input matrix (not shown) as optical signals. The co-processor 100 also comprises a plurality of photonic—in particular, mem-transmittive—memory elements 106 (only two of which are linked to the reference numeral for comprehensibility reasons), arranged at crossing points 108 (only one with a reference sign) of an optical waveguide crossbar array 110, wherein the plurality of photonic memory elements 106 is configured to store values of the data matrix (not shown), and wherein the receiving unit 102 is connected to input lines 112 (only one has a reference sign) of the optical waveguide crossbar array 110.

Thereby, a respective output signal (not explicitly shown) of each of output lines 114 of the optical waveguide crossbar array 110 represents a dot-product between a respective column of the optical waveguide crossbar array and the received input signals 104, and values of elements of the input matrix to be multiplied with the data matrix correspond to light intensities received at input lines 112 of the respective photonic memory elements 106.

It may be noted that for illustration purposes the optical waveguide crossbar array 110 is shown as a 4×4 matrix. However, any other size for the optical waveguide crossbar array 110 is possible, depending on the size of the data matrix. It may also be noted that it is not required that the vertical and horizontal waveguides of the optical waveguide crossbar array 110 is symmetrical, i.e., having the same number of vertical and horizontal waveguides. Especially, if a reference column may be used, the optical crossbar array may have an asymmetrical shape (number of horizontal waveguides is not equal to the number of vertical waveguides).

FIG. 2 shows an illustration of how an input matrix $(x_{11} \ldots x_{ik})$ and the data matrix $(a_{11} \ldots a_{ij})$ may be mapped to the optical waveguide crossbar array 200, comprising the plurality of photonic memory elements 204 (only one of them being shown with a reference numeral), in particular for the data matrix photonic memory element $a_{i1}$), the horizontal waveguide 210 and the vertical waveguides 212. The input matrix and the data matrix are operands of the shown matrix-matrix multiplication equation 202 resulting in the matrix $y_{11} \ldots y_{jk}$.

The elements of the data matrix are represented by the plurality of optical memory elements $a_{11} \ldots a_{ij}$, whereas the input matrix $x_{11} \ldots x_{ik}$ is shown as incoming signals to the input waveguides 206, wherein input values of each input matrix column k . . . 1 are represented as light signals of different wavelength $\lambda_k \ldots \lambda_1$. The values of the input matrix $x_{11} \ldots xa_{ik}$ having the different wavelengths $\lambda_k \ldots \lambda_1$ are received at the same time at the input waveguides.

Consequently, the resulting output matrix $y_{11} \ldots y_{jk}$ is becoming immediately available at the output waveguides 208 (only the leftmost shown with a reference numeral). Hence, the underlying principle is based on a wavelength division multiplexing (WDM). The photonic memory elements 204 control the transmission of light from the input lines 206, i.e., the horizontal waveguides 210, to the vertical waveguides 212, i.e., the output waveguides 208. The couplings of the respective crossing waveguides are directly influenced by the status of the photonic memory elements which may be implemented using phase-change material.

Last but not least, different wavelengths are used for each column of the input matrix optical signals, such that the input matrix is multiplied with the data matrix in one step. Hence, no vector-wise multiplication of elements of the columns (or rows) of the input matrix rows of the data matrix (or columns) and the subsequent summation of the multiplied elements (according to classical vector multiplication) is required. Instead, all elements of the data matrix and the input matrix are used in the same single determination step for the matrix-matrix multiplication. No additional serialization or other intermediate steps may file to determine the result of the matrix-matrix multiplication.

FIG. 3 shows an illustration of how the input matrix $(x_{11} \ldots x_{ik})$ and the data matrix $(a_{11} \ldots a_{ij})$ may (compare equation 202 of FIG. 2) be mapped to the optical waveguide crossbar array if different wavelength may be used per element value of the input matrix. Also the crossbar 200 array—comprising the plurality of photonic memory elements 204—is equivalent to the one in FIG. 2. This holds also to the other elements and the related reference numerals.

However, in case of FIG. 3, the input matrix wavelength handling is different if compared to FIG. 2. Here, in FIG. 3, different wavelengths $\lambda_{ik} \ldots \lambda_{11}$ are used for all—each and every—elements of the input matrix X. This way, a lower degree of crosstalk and interferences at the output waveguides 208 can be achieved.

FIG. 4 shows a block diagram 400 of a convolutional function, typically be used in image recognition. The input image 402 may be of size, e.g., n×n. For computing convolutional functions, typically convolutional kernels 404, 406, 408 may be used ($d_{out}$ number of convolutional kernels may be used), typically comprising comparably simple integer values for determining edges, lines and other image characterizing parameters in the input image 402. The dimension of the convolutional kernels may have the size of, e.g., k×k.

In this example, the input matrix may comprise pixel elements of an input image 402, wherein each k×k pixel patch of input image, on which the kernel is to be applied, is flattened into a vector, each having a dimension of $k^2 \times 1$; the number of such vectors 410 is $(n-k+1)^2$. The dimension of the required optical waveguide crossbar array 412 may easily be determined as $k^2 \times d_{out}$. The output values of the optical waveguide crossbar array 412 may then represent the output image 414. The output image may have the dimensions $(n-k+1)^2$ with $d_{out}$ channels.

This example was described in order to show that the above described multiplications with the convolutional matrix has to be performed $(n-k+1)^2$ times which requires a huge amount of computational effort using classical computing concepts. Today, typical images have a resolution of several megabytes; however, even if images from the ImageNet set may be used, n is 256. Typical kernel sizes may be 3×3, resulting in a number of matrix multiplications of $254^2 = 64,615$.

As known, for image processing and/or recognition purposes convolutional neural networks (CNN) are used applying the above described operation. Hence, it becomes clear that the high number of these operations is a critical bottleneck for the convolutional neural networks. Thus, the here proposed concept may be well suited to address just this problem in a very efficient and elegant way.

This will—in the following—also be illustrated using a simplified version of the example according to FIG. 4.

FIG. 5 shows the already discussed convolution concept 500 using a simple 3×3 image 502 and four convolution kernels 504, 506, 508, 510. The 2×2 kernel matrices built—in a vectorized form—the data matrix 512; e.g., the kernel 504 is mapped to the leftmost column of the data matrix 512. On the other side, portions of the image 502 build the input matrix, here, composed of four input vectors. As examples, the sub-portion 503 comprising the components A, B, D, E build the leftmost column 514 of the input matrix. As second example, the sub-portion 505 comprising the components E, H, F, I, build the components of the leftmost vector or column 520 of the input matrix. The sub-portions of the image 502 corresponding to second and third column 516, 518 ire not shown explicitly with individual frames due to comprehensibility and illustration clarity reasons. This way, an input matrix comprising the four input vectors is defined, and a data matrix 512 is defined. Both matrices may now be multiplied in one single step as mentioned above, and shown in more detail in the following two figures.

FIG. 6 shows a continuation 600 of the example discussed in FIG. 5. The optical waveguide crossbar array 602 shows another example of the already discussed crossing waveguides with photonic memory elements (here, without reference numerals). However, the values of the data matrix 512 (compare FIG. 5) are shown as values stored in the photonic memory elements of the optical waveguide crossbar array 602. On the left side, exemplary, one input vector with elements A, D, B, E equivalent to column 514 of the data matrix built from the four input vectors (compare FIG. 5) is shown. It is also illustrated that for each of these elements a different wavelength is used to further reduce inference. It may also be mentioned, that splitting ratios for the directional couplers at the crossing points of the waveguides are adjusted for equal power distribution. Hence, each column provides the convolutional output for one of the kernels 504, 506, 508, 510 (compare FIG. 5). Exemplary, the formula 604 shown at the leftmost vertical output line of the optical waveguide crossbar array shows the combination of the input vector 514 with the respective values stored in the optical waveguide crossbar array 602, and more particular, stored in the respective photonic memory elements. The other output values 606, 608, 610 are also shown and their values may be determined equivalently to the leftmost output line.

FIG. 7 shows an extended implementation 700 of the general underlying concept illustrated in the context of FIG. 6 using WDM to perform multiple convolutions at the same time. The attribute values stored in the optical waveguide crossbar array 602 (compare FIG. 6) are not shown again. However, the input vectors 514 and 520, as well as those (516, 518) lying in the middle of the input matrix of FIG. 5 are also shown. In this case, each component of the input matrix is using a different wavelength $\lambda_1 \ldots \lambda_{16}$ in a combination with multiplexers 702, 704, 706, 708. As can be seen, each component of the input vector 514 uses for the intensity coded value a different wavelength, i.e., here, $\lambda_1$, $\lambda_5, \lambda_9, \lambda_{13}$. The same applies to the other input vectors of the input matrix (compare also 520).

Consequently, each of the vertical output lines of the optical waveguide crossbar array 602 outputs a mixture of wavelength intensities for $\lambda 1 \ldots \lambda_{16}$ which are demultiplexed by the demultiplexers 710. As an example, the leftmost output waveguide of the optical waveguide crossbar array 602 outputs the wavelength $\lambda_1$-$\lambda_4$, $\lambda_5$-$\lambda_8$, $\lambda_9$-$\lambda_{12}$, $\lambda_{13}$-$\lambda_{16}$, according to the rules of classical matrix-matrix multiplication. Additionally, a photodetector 712 (only shown symbolically) may detect the signals of the output waveguides. These photodetectors 512 may each be integrated or connected to an electronic signal processing circuit (not shown).

It may again be noted that 4×4 matrices are only used as examples. Any other matrix size may also be used for the input matrix and the data matrix. The optical waveguide crossbar array may be arranged according to the required columns and rows.

Summarizing the proposed concept, one may state that convolutional neural networks are some of the most successful deep neural networks out there with a wide range of applications, like image recognition of any kind, autonomous driving, robot control, etc. Secondly, there is a significant interest in having custom hardware—like the here proposed co-processor—for accelerating convolutional neural network operations. State-of-the-art approaches of mapping convolutional layers to a computational memory unit comprising memristive face latency challenges which may be overcome with the here proposed concept. Hence, the proposed processing engine or co-processor using photonic memory elements for storing the elements of the convolutional kernel show a clear performance advantage because the convolutional kernel may be changed much slower that the data of the input matrix. The multitude of input signals that may need to be applied to perform a single convolution operation in one step may be applied simultaneously with different wavelength using WDM principles. This facilitates the simultaneous computation of all matrix-vector multiply operations associated with a single convolution operation.

Embodiments of the invention may be implemented together with virtually any type of computer, regardless of the platform being suitable for storing and/or executing program code. FIG. 8 shows, as an example, a computing system 800 suitable for executing program code related to the proposed method.

The computing system 800 is only one example of a suitable computer system, and is not intended to suggest any limitation as to the scope of use or functionality of embodiments of the invention described herein, regardless, whether the computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the invention, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of the computer system/server 800 via bus 806. It should be understood that, although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, the co-processor 100 or 200 for operating a co-processor for performing a matrix multiplication of an input matrix with a data matrix in one step may be attached to the bus system 806.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The invention claimed is:

1. A co-processor for performing a matrix-matrix multiplication of an input matrix with a data matrix in one step, said co-processor comprising:
    a plurality of photonic memory elements, arranged at crossing points of an optical waveguide crossbar array, wherein said plurality of photonic memory elements is configured to store values of said data matrix, and wherein input lines of said optical waveguide crossbar array receive input signals associated with said input matrix as optical signals;
    wherein a respective output signal of each of output lines of said optical waveguide crossbar array represents a dot-product between a respective column of said optical waveguide crossbar array and said received input signals; and
    wherein values of elements of said input matrix to be multiplied with said data matrix correspond to light intensities received at input lines of said respective photonic memory elements; and
    wherein different wavelengths are used for each column of said input matrix optical signals, such that said input matrix is multiplied with said data matrix in one clock cycle, wherein the input matrix includes multiple rows and multiple columns, and the values of the input matrix are received at a same time at the input lines, wherein all elements of the data matrix and the input matrix are used in a same single determination step for the matrix-matrix multiplication,
    wherein multitude of said input matrix optical signals are applied simultaneously to perform a single convolution operation.

2. The co-processor according to claim 1, wherein different wavelengths are used for each element value of said input matrix.

3. The co-processor according to claim 1, wherein different wavelengths are multiplexed before said optical waveguide crossbar array and de-multiplexed after said optical waveguide crossbar array.

4. The co-processor according to claim 1, wherein each of said plurality of photonic memory elements comprises, adjacent to a nano-photonic waveguide, a phase-change material layer.

5. The co-processor according to claim 1, wherein said elements of said data matrix correspond to values of elements of linearized convolutional kernels of a convolutional neural network.

6. The co-processor according to claim 5, wherein said signal values of said output lines of said optical waveguide crossbar array correspond to elements of a convolution result.

7. The co-processor according to claim 1, wherein each of said output lines of said optical waveguide crossbar array is connected to a respective photodetector.

8. The co-processor according to claim 1, wherein each of said output lines of said optical waveguide crossbar array is connected to a respective integrated optical-digital signal processing unit.

9. The co-processor according to claim 1, wherein one of said columns of said optical waveguide crossbar array is left in a reference state.

10. The co-processor according to claim 1, wherein said optical waveguide crossbar array comprises, at each crossing point, one of said photonic memory elements connecting a respective one of said input lines with a respective one of said output lines.

11. A computer-implemented method for operating a co-processor for performing a matrix-matrix multiplication of an input matrix with a data matrix in one step, wherein a plurality of photonic memory elements is arranged at crossing points of an optical waveguide crossbar array, and wherein said plurality of photonic memory elements is configured to store values of said data matrix, said method comprising:
    receiving input signals for said input matrix as optical signals;
    wherein a respective output signal of each of output lines of said optical waveguide crossbar array represents a dot-product between a respective column of said optical waveguide crossbar array and said received input signals; and
    wherein values of elements of said input matrix to be multiplied with said data matrix correspond to light intensities received at input lines of said respective photonic memory elements; and
    wherein different wavelength are used for each column of said input matrix optical signals, such that said input matrix is multiplied with said data matrix in one clock cycle, wherein the input matrix includes multiple rows and multiple columns, and the values of the input matrix are received at a same time at the input lines, wherein all elements of the data matrix and the input matrix are used in a same single determination step for the matrix-matrix multiplication,
    wherein multitude of said input matrix optical signals are applied simultaneously to perform a single convolution operation.

12. The method according to claim 11, also comprising using different wavelengths for each element value of said input matrix.

13. The method according to claim 11, wherein different wavelengths are multiplexed before said optical waveguide crossbar array and de-multiplexed after said optical waveguide crossbar array.

14. The method according to claim 11, wherein each of said plurality of photonic memory elements comprises, adjacent to a nano-photonic waveguide, a phase-change material layer.

15. The method according to claim 11, wherein said elements of said data matrix correspond to values of elements of linearized convolutional kernels of a convolutional neural network.

16. The method according to claim 15, wherein said signal values of said output lines of said optical waveguide crossbar array correspond to elements of a convolutional result.

17. The co-processor according to claim 11, wherein each of said output lines of said optical waveguide crossbar array is connected to a respective photodetector.

18. The method according to claim 11, also comprising: maintaining one of said columns of said optical waveguide crossbar array in a reference state.

19. The method according to claim 12, wherein said optical waveguide crossbar array comprises, at each crossing point, one of said photonic memory elements connecting a respective one of said input lines with a respective one of said output lines.

20. A computer program product for operating a co-processor for performing a matrix-matrix multiplication of an input matrix with a data matrix in one step, wherein a plurality of photonic memory elements is arranged at crossing points of an optical waveguide crossbar array, wherein said plurality of photonic memory elements is configured to store values of said data matrix;
the computer program product comprising a computer readable storage medium having program instructions embodied therewith, said program instructions being executable by one or more computing systems or controllers to cause said one or more computing systems to:
control a reception of input signals for said input matrix as optical signals, wherein a respective output signal of each of output lines of said optical waveguide crossbar airay represents a dot-product between a respective column of said optical waveguide crossbar array and said received input signals; and
wherein values of elements of said input matrix to be multiplied with said data matrix correspond to light intensities received at input lines of said respective photonic memory elements; and
wherein different wavelength are used for each column of said input matrix optical signals, such that said input matrix is multiplied with said data matrix in one clock cycle, wherein the input matrix includes multiple rows and multiple columns, and the values of the input matrix are received at a same time at the input lines, wherein all elements of the data matrix and the input matrix are used in a same single determination step for the matrix-matrix multiplication,
wherein multitude of said input matrix optical signals are applied simultaneously to perform a single convolution operation.

\* \* \* \* \*